(12) United States Patent
Kline et al.

(10) Patent No.: US 6,684,625 B2
(45) Date of Patent: Feb. 3, 2004

(54) HYBRID ROCKET MOTOR USING A TURBOPUMP TO PRESSURIZE A LIQUID PROPELLANT CONSTITUENT

(75) Inventors: Korey R. Kline, Miami, FL (US); Kevin W. Smith, Coral Gables, FL (US); Thomas O. Bales, Coral Gables, FL (US)

(73) Assignee: Hy Pat Corporation, Miami, FL (US)

( * ) Notice: Subject to any disclaimer, the term of this patent is extended or adjusted under 35 U.S.C. 154(b) by 0 days.

(21) Appl. No.: 10/054,080

(22) Filed: Jan. 22, 2002

(65) Prior Publication Data

US 2003/0136109 A1 Jul. 24, 2003

(51) Int. Cl.[7] .................................................. F02K 9/72
(52) U.S. Cl. ...................................................... 60/251
(58) Field of Search ............................. 60/251; 102/374, 102/381

(56) References Cited

U.S. PATENT DOCUMENTS

| | | | |
|---|---|---|---|
| 4,583,362 A | 4/1986 | Wagner | 60/259 |
| 5,579,636 A | 12/1996 | Rosenfield | 60/251 |
| 5,715,675 A | 2/1998 | Smith et al. | 60/251 |
| 5,722,232 A | 3/1998 | Jones | 60/259 |
| 5,765,361 A | 6/1998 | Jones et al. | 60/204 |
| 5,918,460 A | 7/1999 | Connell et al. | 60/257 |
| 6,073,437 A | 6/2000 | Jones | 60/204 |
| 6,226,980 B1 | 5/2001 | Katorgin et al. | 60/258 |

*Primary Examiner*—Ehud Gartenberg
(74) *Attorney, Agent, or Firm*—Gordon & Jacobson, P.C.

(57) ABSTRACT

A hybrid rocket motor includes a storage tank which stores an oxidizer under relatively low pressure, a turbopump preferably directly coupled to an outlet of the storage tank which pressurizes the oxidizer to a relatively high pressure, a combustion chamber including a solid fuel, and an injector between the turbopump and combustion chamber through which the oxidizer is injected into the combustion chamber. According to a preferred aspect of the invention, the turbopump is operated by an expander cycle of a heat exchanger. According to another preferred aspect of the invention, the fluid flowing through the heat exchanger is oxidizer tapped from the storage tank. A barrier is maintained between an oxidizer feed line from the turbopump and the injector until sufficient pressure is created by the turbopump to pump the oxidizer at the requisite pressure into the injector.

15 Claims, 7 Drawing Sheets

HYBRID ROCKET MOTOR USING A TURBOPUMP TO PRESSURIZE A LIQUID PROPELLANT CONSTITUENT

BACKGROUND OF THE INVENTION

1. Field of the Invention

This invention relates broadly to self-propelled projectiles. More particularly, this invention relates to rockets powered by hybrid propellant systems.

2. State of the Art

Rocket boosters (motors) generally fall into three classes: solid propellant boosters in which a solid fuel element, or grain, undergoes combustion to produce thrust that propels the rocket, liquid propellant boosters that accomplish the same function with a liquid fuel material, and hybrid boosters, described below. Solid and liquid rocket boosters can produce relatively large amounts of thrust, but for a relatively short amount of time. In addition, solid and liquid rocket boosters are generally expensive to develop and produce due to the inherent dangers of the highly combustible solid fuels.

Hybrid rocket boosters are described in detail in co-owned U.S. Pat. No. 5,715,675 to Smith et al., which is hereby incorporated by reference herein in its entirety. They have been characterized as a cross between a solid propellant booster and a liquid propellant booster. Generally hybrid boosters use a fluid reactant (an oxidizer) to burn a solid fuel element, although they may use a combustible liquid fuel and a solid reactant. The hybrid rocket propellant (fuel and reactant together) can be ignited by an igniter, such as an electrically-generated spark, by pyrotechnic means, or by initial injection of an ignition fluid which exothermically reacts with the fuel or reactant. The fuel of a hybrid rocket is inert until mixed with the oxidizer in the presence of an igniter in a combustion chamber. As such, there is no danger of inadvertent and uncontrollable combustion.

When the propellant is combusted, the oxidizer must be injected at a relatively high pressure along the surface of the solid reactant to provide the necessary thrust level. The pressure to inject the oxidizer is created by storing the fluid reactant at a relatively high pressure, e.g., 1000 psi, in a tank. Of course, a tank capable of withstanding 1000 psi must have relatively thick walls and is therefore extremely heavy. The weight of the fluid tank influences rocket flight time and distance traveled.

SUMMARY OF THE INVENTION

It is therefore an object of the invention to provide a hybrid rocket motor which uses a storage tank with relatively thinner walls.

It is also an object of the invention to provide a hybrid rocket motor which stores fluid reactant at relatively low pressures.

It is another object of the invention to provide a hybrid rocket motor which uses a relatively light weight fluid reactant tank.

It is a further object of the invention to provide a hybrid rocket motor which injects fluid reactant into a combustion chamber at a relatively high pressure.

In accord with these objects, which will be discussed in detail below, a hybrid motor includes a storage tank which stores fluid reactant (oxidizer) under relatively low pressure, e.g., 100 psi, a turbopump preferably directly coupled to an outlet of the storage tank which pressurizes the oxidizer to a relatively high pressure, e.g., 1000 psi, a combustion chamber including a solid fuel, and an injector between the turbopump and combustion chamber through which the oxidizer is injected into the combustion chamber. According to a preferred aspect of the invention, the turbopump is operated by expanded gas from a heat exchanger in an expander cycle. According to another preferred aspect of the invention, the fluid flowing through the heat exchanger is the same fluid as the fluid reactant, and more preferably is oxidizer tapped from the storage tank. A barrier is maintained between a fluid reactant feed line from the turbopump and the injector until sufficient pressure is created by the turbopump to pump the fluid reactant at the requisite pressure into the injector.

A rocket is also provided which incorporates the hybrid motor. The rocket includes a nose cone at the fore end, a rear nozzle, and a casing about the hybrid motor.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
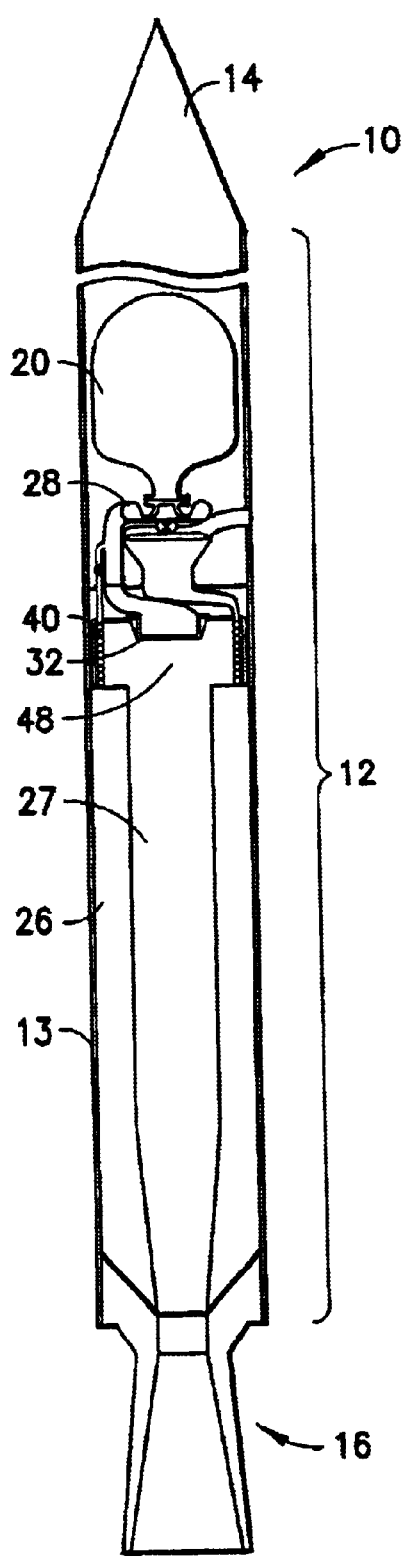
FIG. 1 is a broken longitudinal section view of a rocket provided with a hybrid booster according to the invention.
Figure 2:
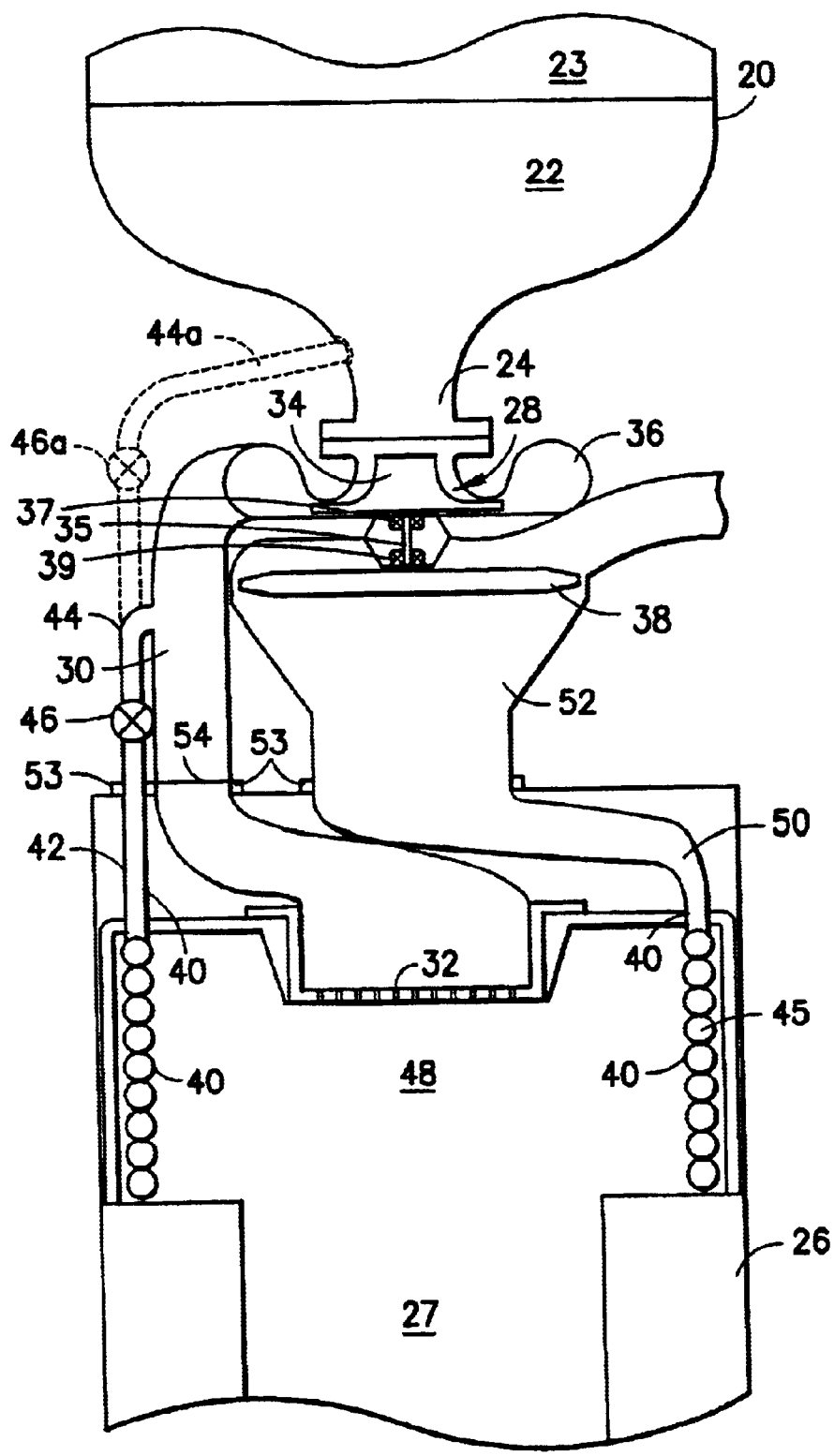
FIG. 2 is a broken schematic of the hybrid motor according to a first embodiment of the invention.

Turning now to FIGS. 1 and 2, a rocket 10 includes a hybrid motor 12 surrounded by a tubular casing 13, a nose cone 14 at a front end of the casing, and an exhaust nozzle 16 at an aft end of the casing. The hybrid motor 12 includes a storage tank 20 holding a fluid oxidizer, preferably liquid oxygen 22, and having an outlet 24, and a pump 28 which operates to pump the liquid oxygen 22 from the storage tank 20 through a main line 30 to an injector 32.

A pressurant such as helium or nitrogen 23 is provided in the tank 20 to increase the tank pressure, e.g., to 100 psi, but does not create the typical high pressure (e.g., 1000 psi) typically created in storage tanks used in hybrid motors. As such, relatively low structural requirements for the tank 20 are necessitated. The motor 12 also includes a combustion chamber 27 provided with a thick-walled tubular cylinder solid fuel grain body 26. The solid fuel grain body 26 is preferably AP/HTPB (ammonium perchlorate/hydroxyl-terminated polybutadiene). The injector 32 preferably extends into the head end 48 of the combustion chamber 27 and injects the oxidizer 22 toward the solid fuel grain body 26.

Figure 2A:
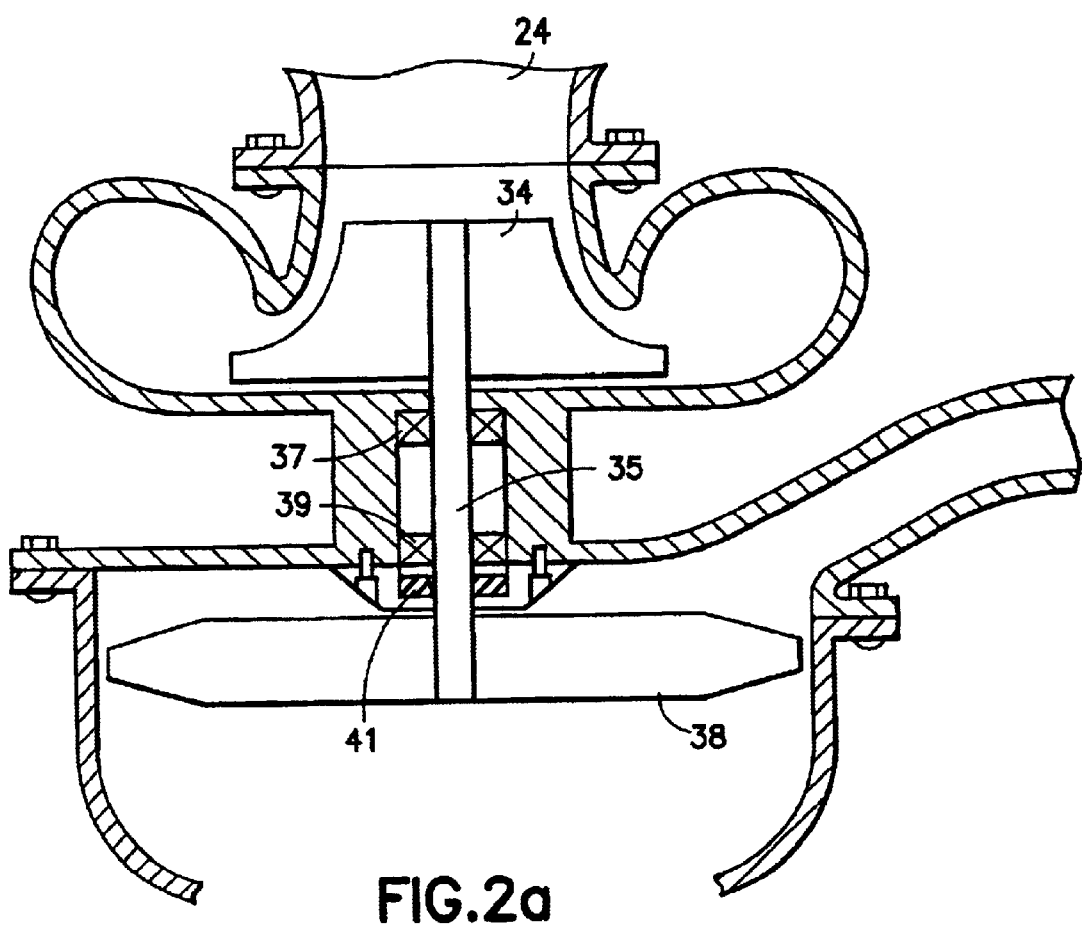
FIG. 2a is an enlarged broken schematic section of the hybrid motor of the first embodiment of the invention.

Referring to FIGS. 2 and 2a, the pump 28 includes a preferably radial impeller 34 adjacent the outlet 24 which pressurizes the oxidizer from the storage tank 20 through volute 36 and into the main line 30. The centrifugal impeller 34 is provided at one end of a shaft 35, and a preferably axial turbine 38 is provided at the other end of the shaft. As such, according to a preferred aspect of the invention, the pump 28 is preferably a turbopump. The axle 35, impeller 34 and turbine 38 are rotodynamically supported on preferably ceramic/metal bearings 37, 39 axially aligned with the outlet 24. A shaft seal 41 is also preferably provided between bearing 39 and the turbine 38. The centrifugal impeller 34 and the turbine 38 are both axially aligned with the outlet 24 of the tank 20, and the outlet 24 of the tank 20 is preferably directly coupled to the pump 28; i.e., without intervening flexible tubes or other tortuous paths therebetween thereby eliminating the complex array of plumbing commonly used in rocket motors provided with a turbopump. Such an arrangement minimizes the pressure drop of fluid flowing from the tank to the pump, which simplifies the design of the pump and improves pump performance.

According to a preferred aspect of the invention, the turbine 38 is preferably powered in an expander cycle by a heat exchanger 40. The heat exchanger 40 includes an inlet 42 which is in fluid communication with the main line 30 via a tap 44, but may alternatively be in fluid communication with the storage tank 20 from a location above the pump, e.g., from a tap 44a (shown in broken lines) extending directly from the tank 20. A throttle control valve 46 is preferably provided in the tap 44. Alternatively, with the tank tap 44a, a valve 46a may also be provided.

According to a first embodiment of the invention, the heat exchanger 40 includes a tubular coil 45 provided around the head end 48 of the combustion chamber, and preferably the injector 32 is situated to extend a distance into the head end. The heat exchanger outlet 50 feeds into an expansion chamber 52, and the axial turbine 38 is provided within the expansion chamber 52. An exit 52 is provided on the other side of the axial turbine 38 from the expansion chamber 52 for venting expanded oxidizer overboard, and may be used, if desired, for attitude control of the rocket. Fluid seals 53 are provided around the tap 40, main line 30, and expansion chamber 52 at the head end of the combustion chamber to prevent liquid oxygen from escaping at the respective locations.

The main line 30 is preferably provided with a flow controller 54 which obstructs the flow of oxidizer into the injector 32 until it is reoriented, destroyed or otherwise at least partially removed from the main line path. The flow controller 54 may be a valve, a burst disc destroyed by pressure, pyrotechnics or otherwise, or the flow controllers (barriers and valves) disclosed in U.S. Pat. Nos. 6,058,697 and No. 6,125,763, which are hereby incorporated by reference herein in its entirety. In operation, with the flow controller 54 and tap valve 46 in closed configurations, liquid oxygen 22 flows from the storage tank, around the centrifugal pump 34, and into the main line 30 when it is stopped by the flow controller 54. When the tap valve 46 is then opened, the liquid oxygen enters the inlet 42 of the heat exchanger 40 and flows into the tubular coils 45 of the heat exchanger. As the liquid oxygen 22 is a cryogenic fluid and the exterior of the heat exchanger is initially at ambient temperature, there is a temperature differential of hundreds of degrees therebetween which causes the liquid oxygen to rapidly warm. The liquid oxygen then exits the outlet 50 of the heat exchanger and enters the expansion chamber 52, where the liquid oxygen (LOX) undergoes a flash expansion to gaseous oxygen (GOX). This energy of the flash expansion rotates the axial impeller 38 which rotates the centrifugal pump 34. As the impeller 38 continues to rotate, the pump 34 increases the pressure of the liquid oxygen on the main line side of the flow controller 54. Once sufficient pressure, e.g., 1000 psi, is created to provide a hybrid motor with suitable thrust, the flow controller 54 is reconfigured, destroyed or otherwise at least partially removed to permit the oxidizer to flow to the injector 32. The injector 32 then injects the highly pressurized liquid oxygen into the combustion chamber 27. When the oxidizer 22 is combusted with the solid fuel grain 26, the rocket is provided with thrust.

It should be appreciated that with the provided arrangement the bearings 37, 39 do not require gas-tight seals. This is in contrast to prior art hybrid rocket motors such as disclosed in U.S. Pat. No. 5,572,864 to Jones which include a turbopump powered by steam generated by a separate motor. In the prior art, different fluids are located on either side of the turbine and the pump (steam and liquid oxygen), and must not be in communication for proper operation of the rocket motor. This necessarily requires the use of gas-tight seals at the bearings between the turbine and the centrifugal pump. However, such seals are difficult to maintain as they must operate across large temperature differentials: the oxidizer is preferably a cryogenic fluid, while the turbine operating fluid, e.g., steam, is much warmer. Seals which operate across such conditions are very expensive and prone to leakage or failure. The present invention does not require the use of gas-tight seals, as oxygen (GOX and LOX) is located on both sides of the turbopump.

Figure 3:
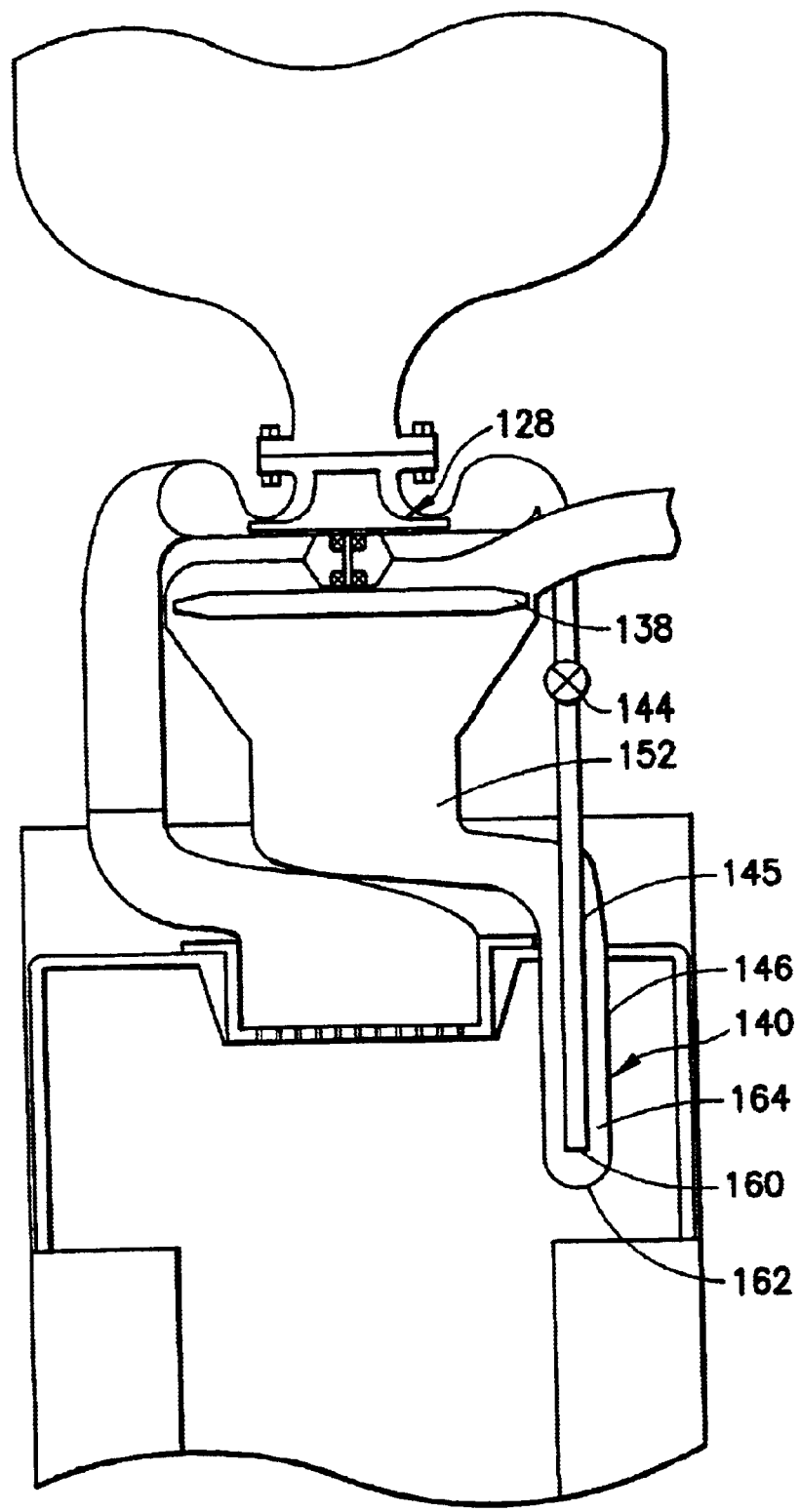
FIG. 3 is a broken schematic of the hybrid motor according to a second embodiment of the invention.

Turning now to FIG. 3, a second embodiment of a turbopump 128 operated in an expander cycle by a heat exchanger and for use in a hybrid rocket motor is shown. The heat exchanger 140 includes two preferably concentric tubes 145, 146. The inner tube 145 includes an open end 160, and the outer tube 146 includes a closed end 162. The open end 160 is provided adjacent the closed end 162. The liquid oxygen is fed into the inner tube 145 and out the open end 160, and then travels up the annular space 164 between the inner and outer tubes to an expansion chamber 152 housing the axial turbine 138. A valve 144 is provided to control the flow of oxygen to the tubes 145, 146.

Figure 4:
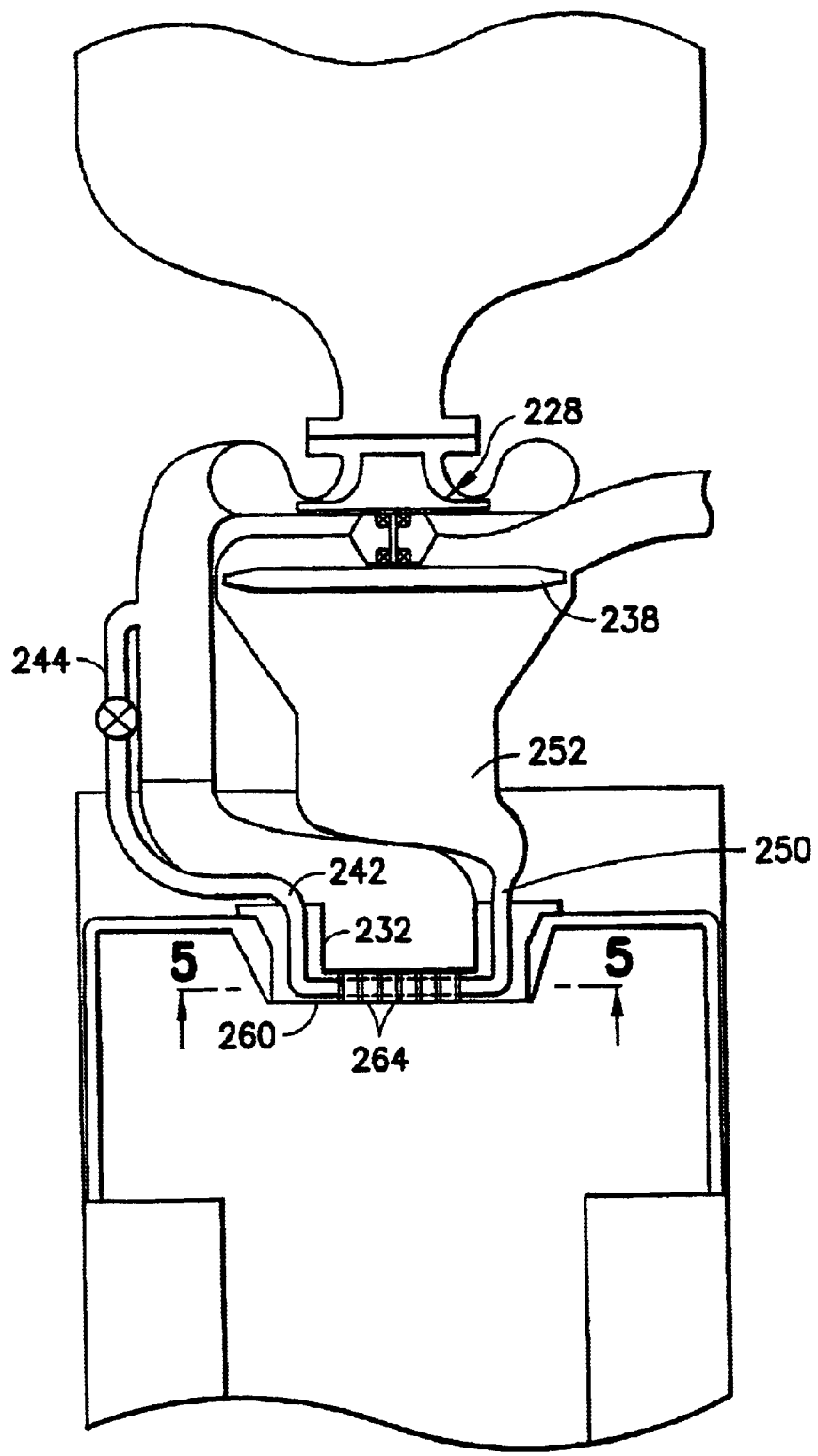
FIG. 4 is a broken schematic of the hybrid motor according to a third embodiment of the invention.
Figure 5:
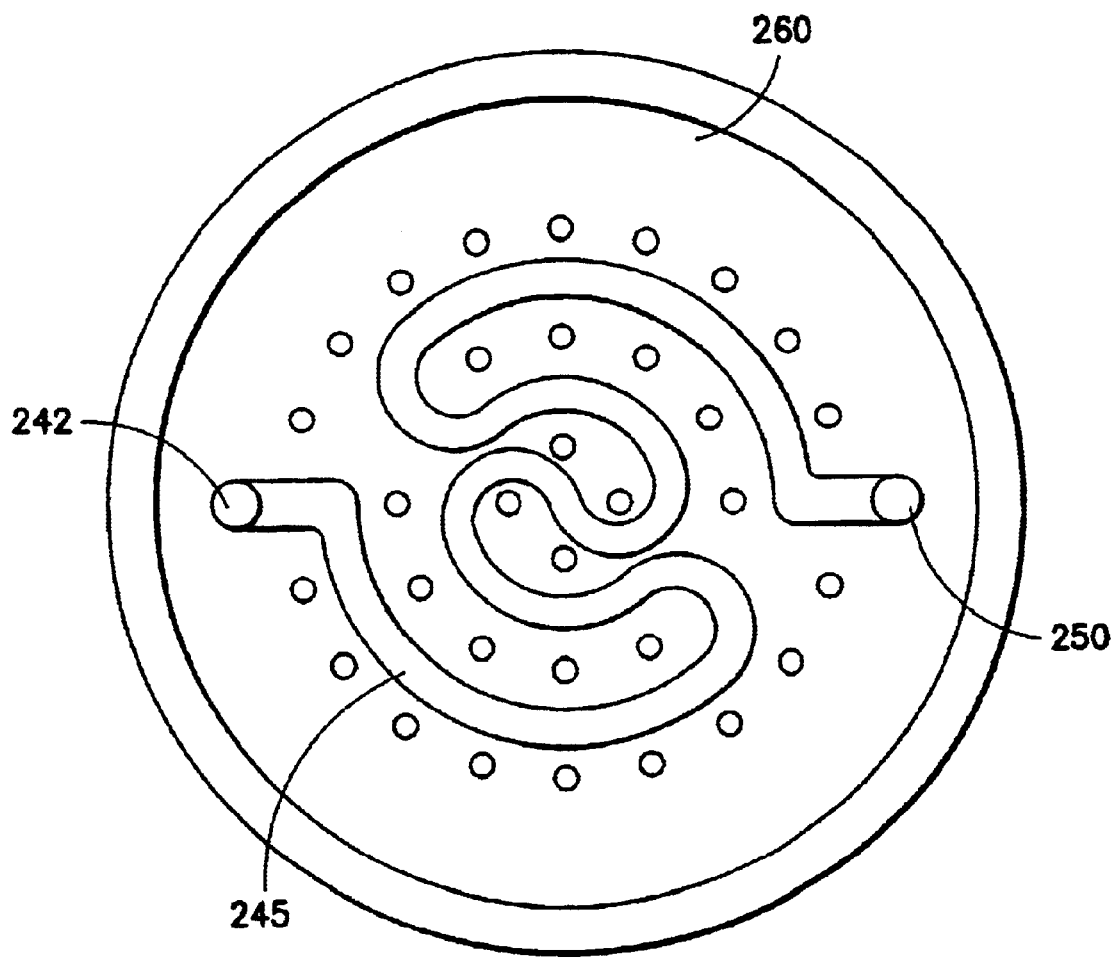
FIG. 5 is a section view across line 5—5 in FIG. 4.

Turning now to FIG. 4, a third embodiment of a turbopump 228 operated in an expander cycle by a heat exchanger and for use in a hybrid rocket motor is shown. Rather than using a tubular coil around the periphery of the head end of the combustion chamber, as described with respect to the first embodiment, the heat exchanger is integrated into the injector 232. Referring to FIGS. 4 and 5, the injector 232 includes a face portion 260 defining a circuitous path 245, and injector holes 264 extending through face portion 260, but not intersecting the path 245. The injector 232 also includes an inlet 242 and an outlet 250 communicating with the path 245.

The inlet 242 is coupled to a tap 244 which receives liquid oxygen. The liquid oxygen flows from the tap 244 to the inlet 242, and through the path 245 to the outlet 250 where it is then expanded in an expansion chamber 252 and causes rotation of the axial impeller 238.

Figure 6:
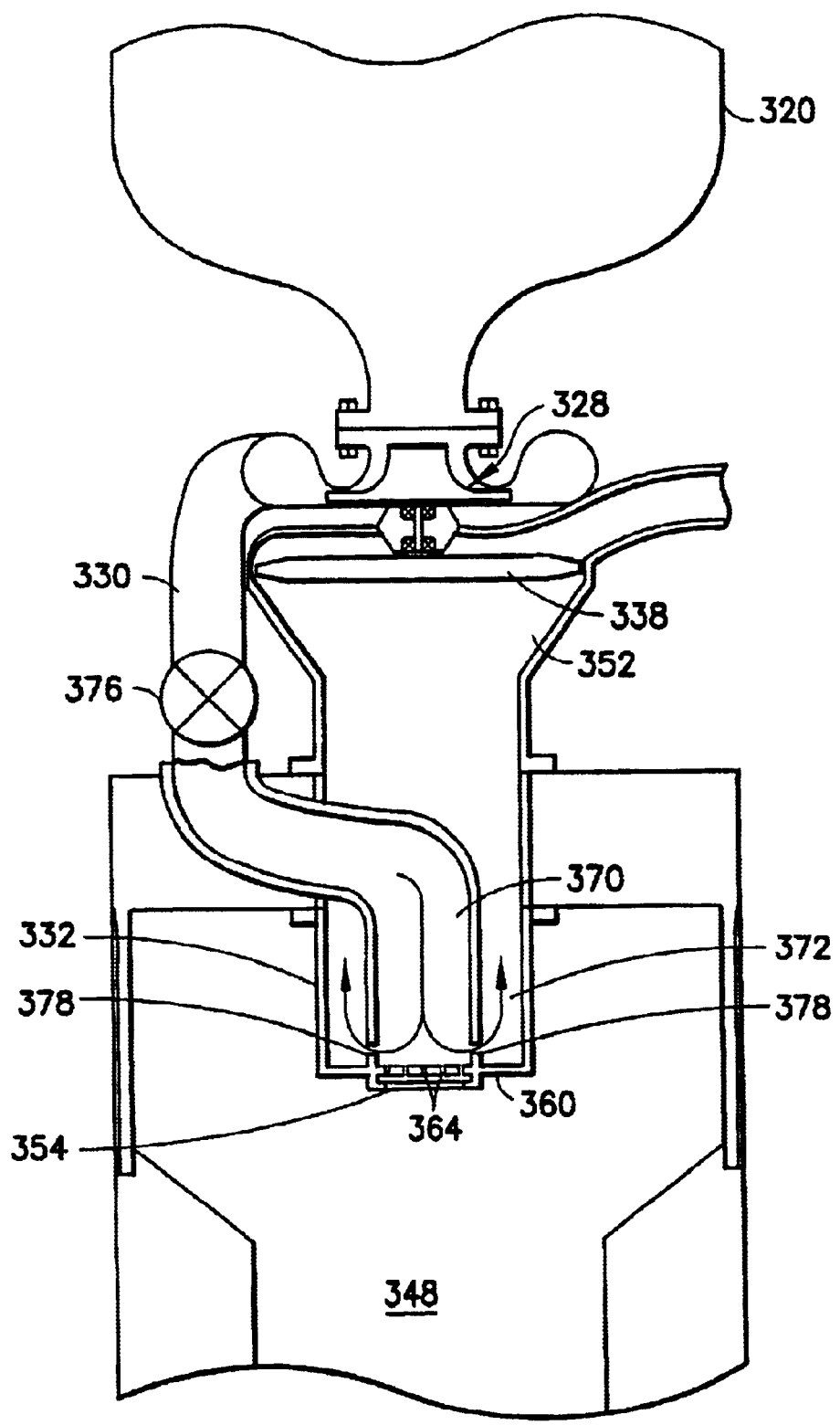
FIG. 6 is a broken schematic of the hybrid motor according to a fourth embodiment of the invention.

Turning now to FIG. 6, a fourth embodiment of a turbopump 328 operated in an expander cycle by a heat exchanger and for use in a hybrid rocket motor is shown. As in the third embodiment, the heat exchanger 340 is integrated into the injector 332. More particularly, the injector 332 extends into the head end of the combustion chamber 348 and includes a concentric arrangement of an aft portion of an inner inlet 370 and an aft portion of an outer outlet 372. A forward portion of the inlet 370 extends through a portion of the outlet and is sealed in communication with the main line 330. A valve 376 is provided in either the main line 330 or the inlet 370, or at a juncture of the two. The face 360 of the injector 332, provided with a plurality of holes 364, is located at an end of the inlet 370, and a burst disc 354 or other removable barrier is preferably provided over the holes 364 on the face 360 of the injector. The outlet 372 extends upwards and expands to form a fluid expansion chamber 352. A plurality of preferably radially oriented taps 378 place the inner and outer pathways 370, 372 in fluid communication adjacent the face 360 of the injector.

When valve 376 is opened, liquid oxygen flows from the tank 320 into the main line 330 and then into the inlet 370 of the injector 332. The oxygen flows through the taps 378 in the wall of the injector and into the outlet 372, where the oxygen is quickly heated and expanded into gaseous oxygen. When the gaseous oxygen enters the expansion chamber 352, it rapidly expands and results in rotation of the axial impeller 338, which thereby operates the pump 328. Once sufficient pressure is created in the inner pathway 370 at the injector face 360 by the pump 328, the barrier 354 is removed, e.g., by bursting at a desired pressure, such that the oxygen is injected through the holes 364 in the face 360 of the injector and into the combustion chamber 348. The continual feed of oxygen from the inlet 370 into the taps 378 and up the outlet 372 continually operates the pump 328 and maintains the injected oxygen at a highly pressurized state.

There have been described and illustrated herein embodiments of a hybrid rocket booster and a rocket provided with the booster. While particular embodiments of the invention have been described, it is not intended that the invention be limited thereto, as it is intended that the invention be as broad in scope as the art will allow and that the specification be read likewise. Thus, while the preferred oxidizer is liquid oxygen, it will be appreciated that other non-self pressurizing oxidants such as red fuming nitric acid (RFNA), nitrogen tetroxide (NTO), and hydrogen peroxide ($H_2O_2$) may also be used. While the hybrid fuel grain is preferably HTPB, other fuel grains known in the art, such as ABS resin, CTPB, PBAN or other fuel/binder systems. In addition, while in the first embodiment a tubular coil of the heat exchanger is provided around the periphery of the head end of the combustion changer, it may be otherwise located, e.g., about the injector, or spaced-apart from both the periphery and the injector. Also, the heat exchanger need not be coiled, but may be provided in another circuitous path adjacent or within the combustion chamber. Furthermore, while the turbine is shown and described in an axial configuration, it will be appreciated that a radial inflow turbine may be used instead. It will therefore be appreciated by those skilled in the art that yet other modifications could be made to the provided invention without deviating from its spirit and scope as so claimed.

What is claimed is:

1. A hybrid rocket motor, comprising:
   a) a container having a fluid reactant therein and an outlet;
   b) a combustion chamber containing a solid reactant therein;
   c) an injector between said container and said combustion chamber; and
   d) a turbopump including a turbine and a pump axially aligned with said outlet, said pump adapted to increase a pressure of said fluid reactant exiting said outlet and injected through said injector into said combustion chamber.

2. A hybrid rocket motor according to claim 1, wherein: said pump is directly connected to said outlet.

3. A hybrid rocket motor according to claim 1, further comprising:
   bearings which support said turbine and said pump, wherein said bearings are not provided with gas-tight seals.

4. A hybrid rocket motor according to claim 1, further comprising:
   e) a heat exchanger at least partially provided in said combustion chamber, said heat exchanger having an inlet and an outlet; and
   f) an expansion chamber coupled to said outlet of said heat exchanger, said turbine being provided in said expansion chamber.

5. A hybrid rocket motor according to claim 1, further comprising:
   d) an at least partially removable barrier between said pump and said injector.

6. A hybrid rocket motor, comprising:
   a) a container having a fluid reactant therein and an outlet;
   b) a combustion chamber containing a solid reactant therein;
   c) an injector between said container and said combustion chamber; and
   d) a heat exchanger at least partially within said combustion chamber.

7. A hybrid rocket motor according to claim 6, further comprising:
   e) a turbopump including a turbine and a pump, said pump adapted to increase a pressure of fluid reactant exiting said outlet and injected through said injector into said combustion chamber.

8. A hybrid rocket motor according to claim 7, wherein: said pump is directly connected to said outlet.

9. A hybrid rocket motor according to claim 7, wherein: said turbopump includes bearings which support said turbine and said pump, and wherein said bearings are not provided with gas-tight seals.

10. A hybrid rocket motor according to claim 7, further comprising:
    f) an at least partially removable barrier between said pump and said injector.

11. A projectile, comprising:
    a) a motor having a forward end and an aft end, said motor including,
       i) a container having a fluid reactant therein and an outlet,
       ii) a combustion chamber containing a solid reactant therein,
       iii) an injector between said container and said combustion chamber, and
       iv) a turbopump including a turbine and a pump axially aligned with said outlet, said pump adapted to increase a pressure of said fluid reactant exiting said outlet and injected through said injector into said combustion chamber;
    b) a tubular casing around said motor;
    c) a nose portion coupled to said forward end of said motor; and
    d) a nozzle coupled to said aft end of said motor.

12. A projectile, comprising:
    a) a motor having a forward end and an aft end, said motor including,
       i) a container having a fluid reactant therein and an outlet, ii) a combustion chamber containing a solid reactant therein,
iii) an injector between said container and said combustion chamber, and
iv) a heat exchanger at least partially within said combustion chamber;

b) a tubular casing around said motor;
c) a nose portion coupled to said forward end of said motor; and
d) a nozzle coupled to said aft end of said motor.

13. In a hybrid rocket motor having a container storing a fluid oxidizer and having a first outlet, a combustion chamber containing a solid fuel grain therein, a turbopump including a turbine side and a pump side, said pump side adapted to increase a pressure of the fluid oxidizer exiting said first outlet and injected into said combustion chamber, the improvement comprising:

a gaseous form of the oxidizer on said turbine side of said turbopump, and a liquid form of said oxidizer on said pump side of said turbopump.

14. The improvement of claim 13, wherein:
said oxidizer is oxygen.

15. The improvement of claim 13, wherein:
said liquid oxidizer is converted into said gaseous oxidizer using an expansion cycle of a heat exchanger.

* * * * *